United States Patent
Yamano et al.

(10) Patent No.: US 10,029,294 B2
(45) Date of Patent: Jul. 24, 2018

(54) METHOD FOR MANUFACTURING HOT-PRESS FORMED STEEL-MEMBER, AND THE HOT-PRESS FORMED STEEL-MEMBER

(71) Applicant: Kobe Steel, Ltd., Kobe-shi (JP)

(72) Inventors: Takayuki Yamano, Kakogawa (JP); Noriyuki Jimbo, Kakogawa (JP); Tatsuya Asai, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 330 days.

(21) Appl. No.: 14/380,180

(22) PCT Filed: Mar. 29, 2013

(86) PCT No.: PCT/JP2013/059682
§ 371 (c)(1),
(2) Date: Aug. 21, 2014

(87) PCT Pub. No.: WO2013/147228
PCT Pub. Date: Oct. 3, 2013

(65) Prior Publication Data
US 2015/0024234 A1    Jan. 22, 2015

(30) Foreign Application Priority Data
Mar. 30, 2012    (JP) .................................. 2012-083003

(51) Int. Cl.
*B21D 22/02*    (2006.01)
*C22C 38/06*    (2006.01)
(Continued)

(52) U.S. Cl.
CPC ......... *B21D 22/022* (2013.01); *B21D 22/208* (2013.01); *B32B 15/013* (2013.01);
(Continued)

(58) Field of Classification Search
CPC .... B21D 22/022; B21D 22/208; B21D 5/006; B21D 5/008; C22C 38/04; C22C 38/06; C22C 38/20
See application file for complete search history.

(56) References Cited

U.S. PATENT DOCUMENTS 2,975,511 A * 3/1961 Johnson ............... B21D 53/265
29/894.325
5,329,799 A * 7/1994 Ito ......................... B21D 22/30
72/340
(Continued)

FOREIGN PATENT DOCUMENTS

EP    1 642 991 A1    4/2006
JP    2001329353 A *    11/2001
(Continued)

OTHER PUBLICATIONS

JPO machine translation of JP 2007063578 A.*
(Continued)

*Primary Examiner* — Pradeep C Battula
(74) *Attorney, Agent, or Firm* — Oblon, McClelland, Maier & Neustadt, L.L.P.

(57) ABSTRACT

Provided is a method for manufacturing a hot-press formed steel-member that is capable of reducing LME without causing cracking of a galvanized steel sheet. The method includes using a galvanized steel sheet, as a base steel, having a prescribed chemical composition, heating the galvanized steel sheet to not lower than an $Ac_3$ transformation-point, and executing hot-press forming at least twice after the heating. Every hot-press forming in is executed so that to satisfy the following expression (1): $(R/t) > \sqrt{(a \cdot (T-b))}$, where "R" is a curvature radius (mm) of a shoulder of a tool used in the hot-press forming, "t" is a thickness (mm) of the galvanized steel sheet, "T" is a forming-start temperature (°
(Continued)

C.) of the hot-press forming, "a" is a constant 0.2984, and "b" is a constant 590.

13 Claims, 11 Drawing Sheets

(51) Int. Cl.
| | |
|---|---|
| C22C 38/58 | (2006.01) |
| C22C 38/00 | (2006.01) |
| C22C 38/02 | (2006.01) |
| C22C 38/04 | (2006.01) |
| C22C 38/28 | (2006.01) |
| C22C 38/32 | (2006.01) |
| C22C 38/34 | (2006.01) |
| C22C 38/38 | (2006.01) |
| C22C 38/42 | (2006.01) |
| C22C 38/50 | (2006.01) |
| C22C 38/54 | (2006.01) |
| B21D 22/20 | (2006.01) |
| B32B 15/01 | (2006.01) |
| C22C 38/14 | (2006.01) |
| C21D 1/18 | (2006.01) |

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *C22C 38/28* (2013.01); *C22C 38/32* (2013.01); *C22C 38/34* (2013.01); *C22C 38/38* (2013.01); *C22C 38/42* (2013.01); *C22C 38/50* (2013.01); *C22C 38/54* (2013.01); *C22C 38/58* (2013.01); *C21D 1/18* (2013.01); *Y10T 428/1241* (2015.01)

(56) References Cited

U.S. PATENT DOCUMENTS

| | | | |
|---|---|---|---|
| 8,460,800 B2 * | 6/2013 | Hoshika | .......... C22C 38/001 428/213 |
| 2005/0257862 A1 | 11/2005 | Asai et al. | |
| 2006/0185774 A1 | 8/2006 | Nishibata et al. | |
| 2012/0118438 A1 | 5/2012 | Nakagaito et al. | |
| 2014/0209217 A1 | 7/2014 | Nakagaito et al. | |

FOREIGN PATENT DOCUMENTS

| | | | |
|---|---|---|---|
| JP | 2004-160489 | | 6/2004 |
| JP | 2004270029 A | * | 9/2004 |
| JP | 2007063578 A | * | 3/2007 |
| JP | 2007-182608 | | 7/2007 |
| JP | 2009-82992 | | 4/2009 |
| JP | 2010-90463 | | 4/2010 |
| KR | 10-2012-0023804 A | | 3/2012 |
| WO | 2007/129676 A1 | | 11/2007 |
| WO | 2008/153183 A1 | | 12/2008 |

OTHER PUBLICATIONS

JPO machine translation of JP 2004270029 A.*
Extended European Search Report dated Oct. 13, 2015 in Patent Application No. 13768756.2.
International Search Report dated Jun. 25, 2013, in PCT/JP2013/059682, filed Mar. 29, 2013.
Written Opinion of the International Searching Authority dated Jun. 25, 2013, in PCT/JP2013/059682, filed Mar. 29, 2013.

* cited by examiner

FIG. 2
(a)
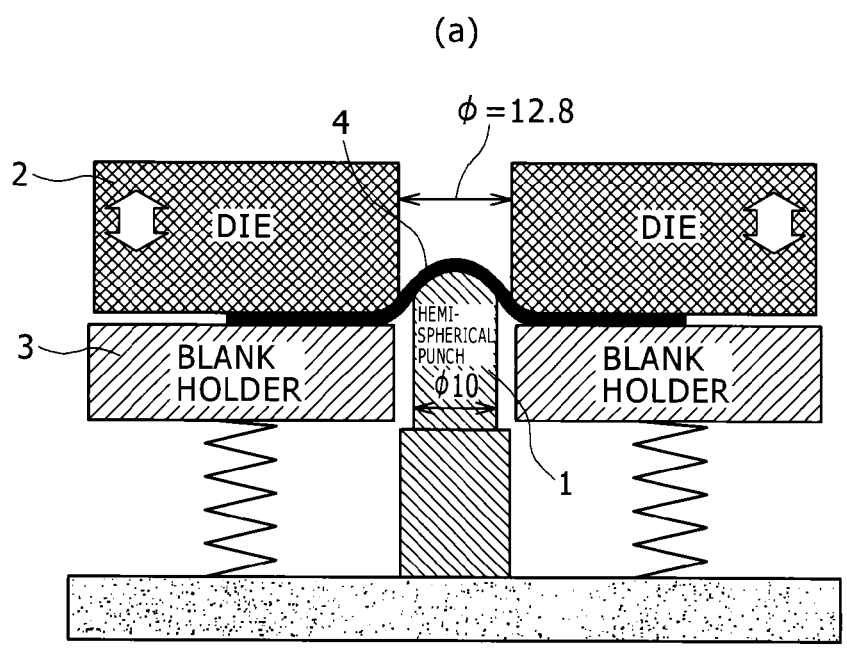
(b)
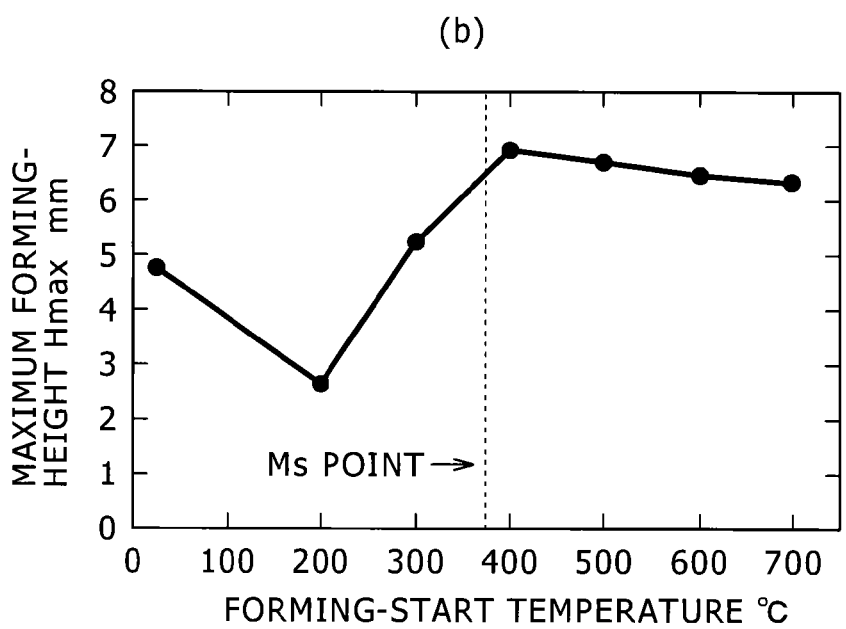

| | |
|---|---|
| MATERIAL SIZE | : 100mm IN LENGTH x 50mm IN DEPTH |
| PAD PRESSURE | : 5t |
| CLEARANCE (DISTANCE BETWEEN PUNCH AND BEND-BLADE) | : 1.4 mm (SAME AS SHEET THICKNESS) |
| HEATING CONDITION | : 930°C x 6 MIN |
| FORMING-START TEMPERATURE | : 750°C, 700°C, 650°C, 600°C, 550°C (FORCED AIR COOLING AT COOLING RATE OF 30°C/ SEC UNTIL START OF FORMING) |
| BEND R (rp) | : 2.5mm, 5.0mm, 7.5mm, 10mm, AND 15mm |

FIG.6
(a)
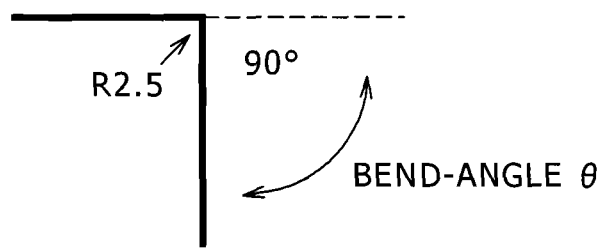
(b)
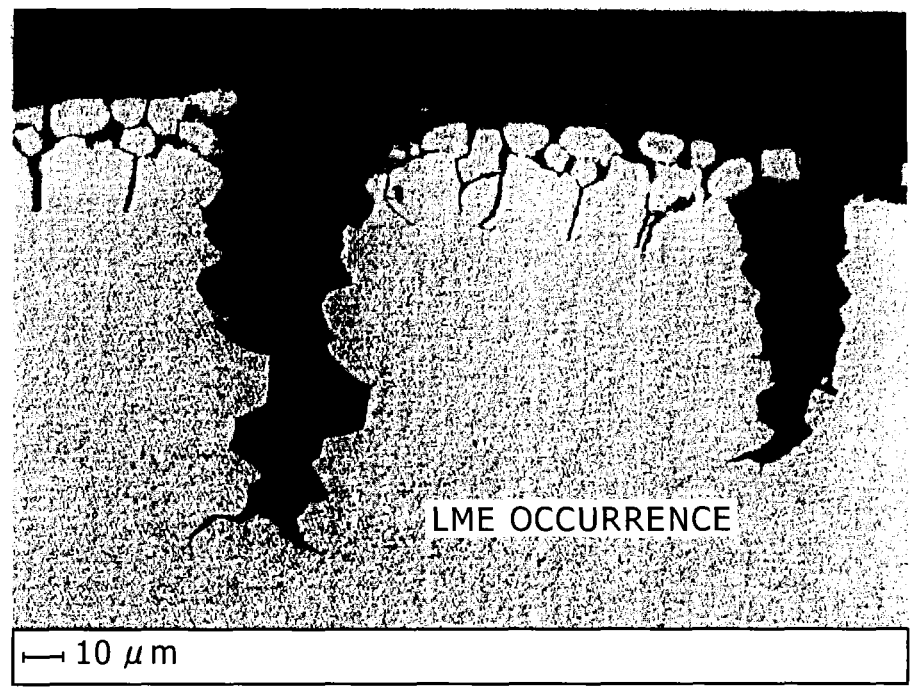

FIG.7
(a)
(b)
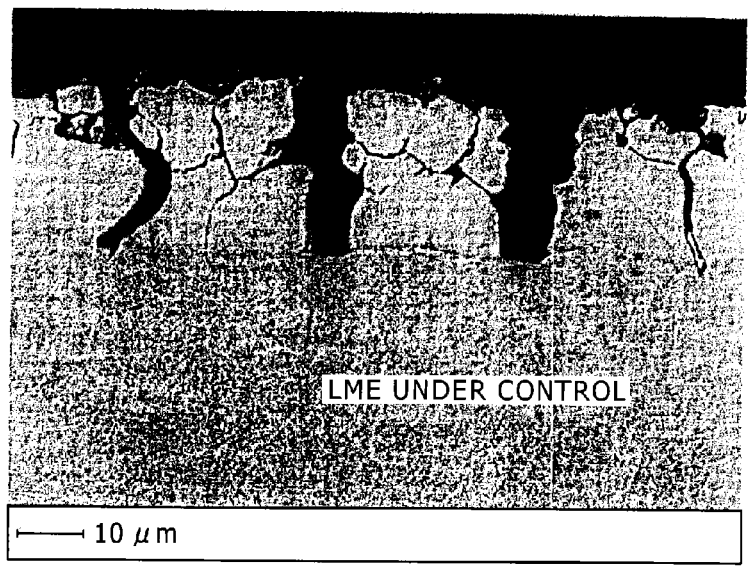
FIG.8
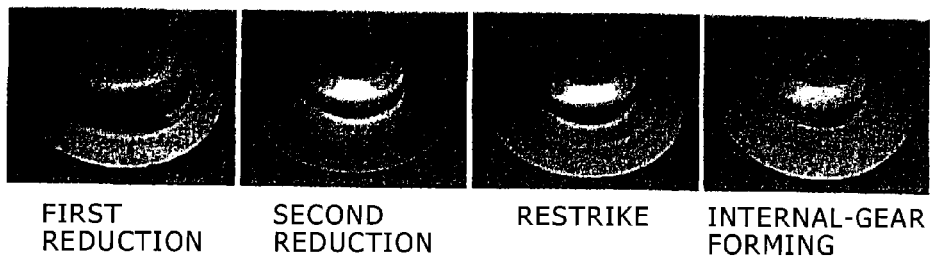

FIG.11
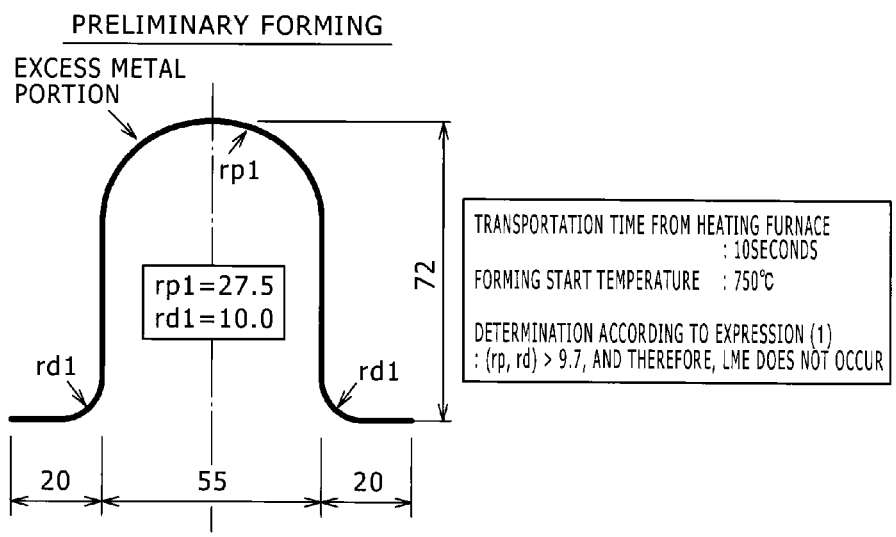
(a) PRELIMINARY FORMING
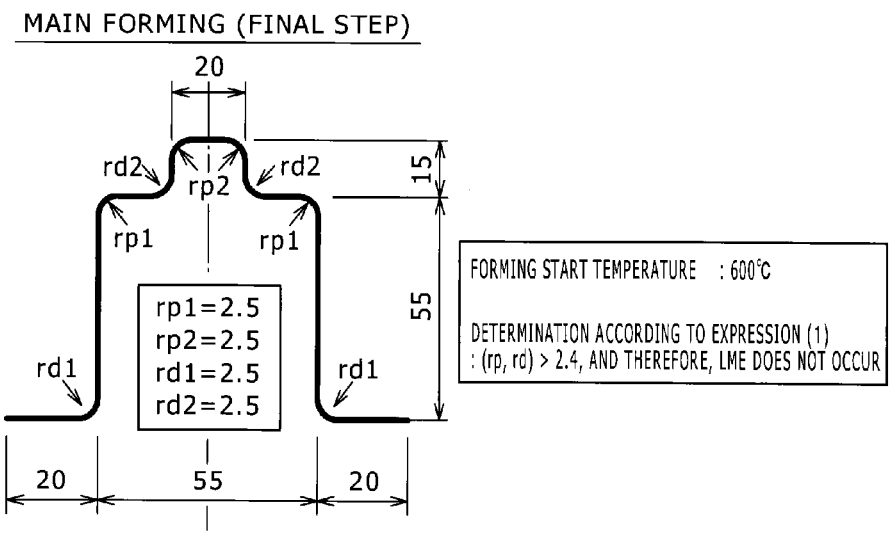
(b) MAIN FORMING (FINAL STEP)

METHOD FOR MANUFACTURING HOT-PRESS FORMED STEEL-MEMBER, AND THE HOT-PRESS FORMED STEEL-MEMBER

TECHNICAL FIELD

The invention relates to a method for manufacturing a hot-press formed steel-member, and the hot-press formed steel-member, the method being a method whereby a galvanized steel sheet (including a hot-dip galvanizing-coated steel sheet, a hot-dip galvannealing-coated steel sheet, and an electrogalvanized steel sheet, referred to as "a blank" below on occasions) used as a material in the field of manufacturing a thin steel-sheet as a formed product, mainly applied to an automobile body is heated to an austenite transformation-point (an $Ac_3$ transformation-point) or higher to be subsequently hot press worked (formed), and the method is related to a method for manufacturing the hot press formed-steel member with intergranular cracking due to liquid metal embrittlement, under control, while exhibiting a high strength not less than 780 MPa, in particular.

BACKGROUND ART

Advances have since been in higher strength with respect to automobile steel-components (use of a high tensile-strength steel) for attaining compatibility of safety at a collision and weight reduction. Meanwhile, at the time of cold stamping of the high tensile-strength steel, there exists a problem such as an increase in forming load, deterioration in size accuracy, and so forth.

There has been known a hot-press forming technology as a means for solving the problem, the technology being for use in the press forming of a steel sheet as a material, in as-heated state, to thereby concurrently realize the forming and the higher strength. With this method, a steel sheet in high-temperature state is held at the bottom dead center of forming to be cooled, while being formed by use of a tool (a punch, and a die) to thereby effect rapid cooling by dissipation of heat from the steel sheet into the tool, and quenching of the material is executed. A formed product (a steel component, a steel member) excellent in size accuracy, and high in strength can be obtained by virtue of this hot-press forming technology.

Further, with an automobile steel component, a steel sheet with zinc coating applied thereto is often used from the viewpoint of corrosion resistance. However, in the case where the hot-press forming is applied to a galvanized steel sheet, intergranular cracking occurs to the formed product, due to liquid metal embrittlement (hereinafter referred to simply as LME on occasions), and the cracking poses a major problem in practical usage.

As a means for solving LME, there has been known a technology whereby both the coating and the composition of a material are optimized, and a galvanized steel sheet is quenched before the hot press forming is executed, as described in, for example, patent literature 1.

CITATION LIST

Patent Literature

Patent literature 1: Japanese Unexamined Patent Application Publication No. 2007-182608

SUMMARY OF INVENTION

Technical Problem

Unfortunately, if an attempt is made to solve the problem of the LME on such a forming condition that quenching is executed before the press forming, as described in Patent document 1, this will result in occurrence of demerits including (1) the necessity of a quenching apparatus required of forming facilities, and (2) an increase in the risk of inviting an increase in forming load, and deterioration in formability (occurrence of cracking) because a forming-start temperature turns lower, so that a portion of the formed product, below an Ms point in the vicinity of 400° C., will become susceptible to occur in the middle of forming. FIG. 1 is a view showing an increase in the forming load described as above, being a graph showing a relationship between a punching temperature at the time of punching a steel sheet and a shearing load (CL in FIG. 1 signifies a clearance, indicating a proportion (%) thereof if a sheet thickness is defined as 100%). Further, the forming load is evaluated on the basis of the shearing load indicted on the vertical axis in FIG. 1.

Further, FIG. 2 (b) shows a relationship between a forming-start temperature and a maximum forming-height Hmax, at a time when the hot-press forming of a galvanized steel sheet is executed by use of a method shown in FIG. 2 (a). In FIG. 2 (a), reference sign 1 denotes a hemi-spherical punch, 2 a die, 3 a blank holder, and 4 a blank respectively. Further, a passage capable of allowing a cooling medium (for example, water) to pass therethrough is formed inside the hemi-spherical punch 1, and the die 2, respectively, such that these members are cooled by the cooling medium passing through the respective passages. The maximum forming-height Hmax in FIG. 2 (b) indicates a forming-height at which a cracking (a fracture penetrating in the thicknesswise direction of a sheet) has occurred at the time of forming.

If the temperature in the middle of the forming is below the Ms point in the vicinity of 400° C., as shown in FIG. 1, and FIG. 2 (b), respectively, this will cause a problem in that the forming load abruptly increases, and formability (the maximum forming-height Hmax) abruptly deteriorates. In the case of forming a galvanized steel sheet into a complex shape, in particular, there will be an increase in contact time between the galvanized steel sheet as the material and the tool, and the temperature of the galvanized steel sheet will be susceptible to decrease, so that the risk of the increase in the forming load, and the cracking will further increase.

The present invention has been developed with an eye on the circumstances described as above, and it is therefore an object of the invention to provide a method for applying hot-press forming to a galvanized steel sheet to manufacture a hot-press formed steel-member, thereby establishing the method capable of reducing LME without causing an increase in forming load as well as deterioration in formability (occurrence of cracking).

Solution to Problem

There is provided a method for manufacturing a hot-press formed steel-member, having succeeded in achieving the object of described as above, the method including a step of using a galvanized steel sheet, a base steel thereof, having a chemical composition including C: not less than 0.10% (by mass %, the same applies to a chemical component hereinafter), not more than 0.35%, Mn: not less than 1.0%, not more than 3.5%, Si: not less than 0.1%, not more than 2.5%, and Al: not more than 0.5% (not including 0%), with the balance being iron and unavoidable impurities, a heating step of heating the galvanized steel sheet to not lower than an $Ac_3$ transformation-point, and a hot-press forming step of executing hot-press forming at least twice after the heating step. Further, every hot-press forming in the hot-press forming step is executed in such a way as to satisfy the following expression (1).

[formula 1]

$$\frac{R}{t} > \sqrt{a \cdot (T-b)} \qquad (1)$$

where "R" is a curvature radius (mm) of a shoulder of a tool used in the hot-press forming, "t" is a thickness (mm) of the galvanized steel sheet, "T" is a forming-start temperature (° C.) of the hot-press forming, "a" is a constant 0.2984, and "b" is a constant 590.

A curvature radius of the shoulder of a tool for use in the hot-press forming is preferably smaller than that of a tool used in hot-press forming executed prior to the relevant hot-press forming.

For the galvanized steel sheet, a galvanized steel sheet, the base steel thereof, including the Si-content not less than 0.5% is preferably used, because a steel member higher in strength can be obtained.

For the galvanized steel sheet, use may be made of a galvanized steel sheet, the base steel thereof, further containing, as other elements, the followings:
(a) B: not more than 0.005% (not including 0%),
(b) Ti and/or Nb: not more than 0.10%, in total (not including 0%),
(c) Ni and/or Cu: not more than 0.5%, in total (not including 0%), and
(d) Cr and/or Mo: not more than 3.5%, in total (not including 0%).

The invention also incorporates a hot-press formed steel-member obtained by the method for manufacturing a hot-press formed steel-member, described as above.

Advantageous Effects of Invention

At the time of applying the hot-press forming according to the invention to a galvanized steel sheet, the shape of a tool used in the hot-press forming, the sheet thickness of the galvanized steel sheet, and the forming-start temperature of the hot-press forming are all controlled so as to satisfy the expression (1) as prescribed, so that LME can be reduced, and cracking of the galvanized steel sheet can be prevented.

BRIEF DESCRIPTION OF DRAWINGS

FIG. 2 (a) is a view showing geometries of hot-press forming, and FIG. 2 (b) is a graph showing a relationship between a forming-start temperature and a maximum forming-height Hmax, at a time when the hot-press forming is applied to a galvanized steel sheet.

FIG. 6 (a) is a view broadly showing an L-bend forming at 90° (the curvature radius R=2.5 mm, and a bend-angle θ=90°, with respect to the shoulder of a tool used in the hot-press forming, and FIG. 6 (b) is a view showing a photograph with respect to cross-sections of a steel sheet, in the vicinity of the bend thereof.

FIG. 7 (a) is a view broadly showing an L-bend forming at 15° (the curvature radius R=2.5 mm, and a bend-angle θ=15°, with respect to the shoulder of a tool used in the hot-press forming, and FIG. 7 (b) is a view showing a photograph with respect to cross-sections of a steel sheet, in the vicinity of the bend thereof.

FIG. 8 is a view of a photograph showing a manufacturing example of a complex-shaped formed product manufactured by use of multiple-step cold-stamping according to the related art.

FIG. 11 (a) is a sectional view showing the shape of work in process after preliminary forming, and FIG. 11 (b) is a sectional view showing the shape of the work in process after final forming.

DESCRIPTION OF EMBODIMENTS

Figure 1:
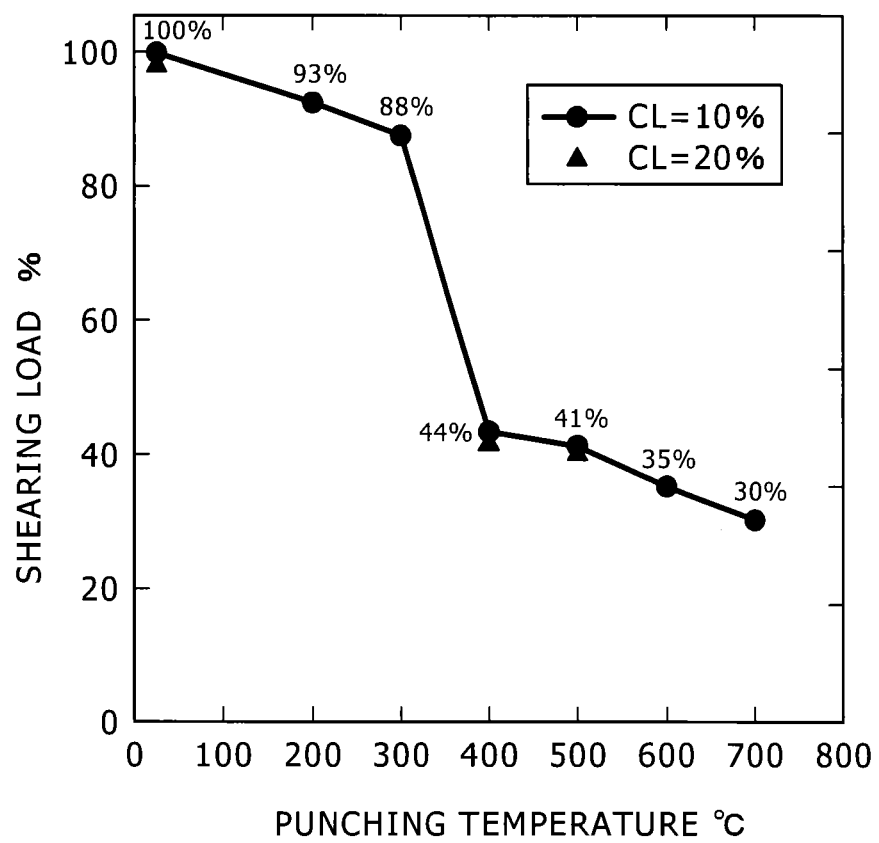
FIG. 1 is a graph showing a relationship between a punching-temperature at the time of punching a galvanized steel sheet and a shearing load.
Figure 3:
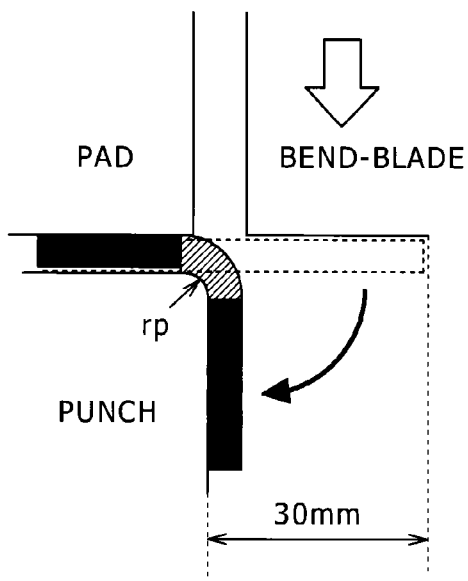
FIG. 3 is a view for illustrating L-bend forming of a steel sheet.

In order to solve the problem described as above, the inventor, et al. applied bend-forming (90° L-bend forming in one step, as shown in FIG. 3) to respective hot-press galvanized steel sheets (blanks) obtained by applying GI coating (hot-dip galvanizing coating), or GA coating (hot-dip galvannealing coating) to base steel sheet denoted by respective blank signs A, B, D, and E (the blank sign A indicates a common hot-press steel sheet), shown in Table 1 below, whereupon various evaluations were made with respect to LME, and strenuous review was repeatedly carried out. As a result, it was ascertained that not only the forming-start temperature that was regarded as the cause of LME occurrence, in the past, but also an amount of strain added to the steel sheet, at the time of forming, largely affects LME (that is to say, the curvature radius of a bend, as well, largely affects LME), thereby having completed the present invention. Description in detail is given below.

TABLE 1

| Material (blank) sign | Chemical composition (mass %) of base steel of blank (balance, Fe and unavoidable impurities) | | | | | | | | | | | | | Base steel | $Ac_3$ (° C.) | Coating Type | Coating weight |
|---|---|---|---|---|---|---|---|---|---|---|---|---|---|---|---|---|---|
| | C | Si | Mn | P | S | Al | Cr | Ti | B | N | O | Cu | Ni | | | | |
| A | 0.22 | 0.19 | 1.22 | 0.005 | 0.001 | 0.041 | 0.31 | 0.026 | 0.0015 | 0.0044 | 0.0003 | — | — | hot-rolled pickled material | 783 | GI | 70 g/m² |
| B | 0.18 | 1.91 | 2.51 | 0.005 | 0.001 | 0.042 | 0.11 | 0.025 | 0.0025 | 0.0055 | 0.0005 | 0.11 | 0.10 | as cold-rolled | 829 | GI / GA | 70 g/m² / 45 g/m² |
| C | 0.18 | 1.68 | 2.21 | 0.005 | 0.001 | 0.035 | 0.12 | 0.021 | 0.0011 | 0.0055 | 0.0005 | — | — | as cold-rolled | 831 | GI / GA | 70 g/m² / 45 g/m² |
| D | 0.17 | 1.35 | 2.20 | 0.005 | 0.001 | 0.035 | — | — | — | 0.0043 | 0.0004 | — | — | cold-rolled annealed material | 820 | GI | 100 g/m² |
| E | 0.21 | 1.20 | 2.5 | 0.011 | 0.005 | 0.041 | — | 0.023 | 0.0020 | 0.0043 | 0.0005 | — | — | as cold-rolled | 795 | GA / GA | 80 g/m² / 35 g/m² |

\* sheet-thickness is 1.4 mm with respect to all the blanks

FIG. 3 is a view for use in illustrating a tool configuration, and a forming condition, at the time of L-bend forming of a steel sheet as a target of forming. The forming-start temperature of the forming condition was changed to 750° C., 700° C., 650° C., 600° C., and 550° C., respectively, and the curvature radius of the shoulder of a tool (bend R, and a curvature radius rp of the shoulder of a punch, in FIG. 3) was changed to 2.5 mm, 5.0 mm, 7.5 mm, 10 mm, and 15 mm, respectively.

Tables 2 through 5, described below, each are a Table showing the presence or the absence of LME occurrence at the time of changing the forming-start temperature and the curvature radius R (the bend R, rp) of the bend of a tool on the basis of each of the galvanized steel sheets described as above. In Tables 2 through 5, described below, respectively, the case where the intergranular cracking has reached to a depth not less than 5 μm from a surface layer of the base steel is defined as the condition of LME occurrence to be indicated as "X", whereas the condition of LME non-occurrence is indicated as "○". A reference for use in determining the presence or the absence of LME occurrence is the same with respect to Tables 7, and 8, described later on. Further, in Tables 2 through 5, respectively, there is listed a strain (a surface layer strain of a steel sheet, and a strain added to an outer portion of the bend R of the steel sheet, which are listed simply as "a strain" on occasions) corresponding to the curvature radius (rp) of the shoulder of every tool, as well.

TABLE 2

Material A (GI 70 g/m²)

| Bend R rp | Surface-layer strain | Forming-start temperature | | | | |
|---|---|---|---|---|---|---|
| | | 550° C. | 600° C. | 650° C. | 700° C. | 750° C. |
| 2.5 mm | 22% | ○ | ○ | X | X | X |
| 5.0 mm | 12% | ○ | ○ | X | X | X |
| 7.5 mm | 9% | ○ | ○ | ○ | X | X |
| 10 mm | 7% | ○ | ○ | ○ | ○ | ○ |
| 15 mm | 5% | ○ | ○ | ○ | ○ | ○ |

○: Absence of LME occurrence
X: Presence of LME occurrence

TABLE 3

Material B (GI 70 g/m²)

| Bend R rp | Surface-layer strain | Forming-start temperature | | | | |
|---|---|---|---|---|---|---|
| | | 550° C. | 600° C. | 650° C. | 700° C. | 750° C. |
| 2.5 mm | 22% | ○ | ○ | X | X | X |
| 5.0 mm | 12% | ○ | ○ | X | X | X |
| 7.5 mm | 9% | ○ | ○ | ○ | X | X |
| 10 mm | 7% | ○ | ○ | ○ | ○ | ○ |
| 15 mm | 5% | ○ | ○ | ○ | ○ | ○ |

○: Absence of LME occurrence
X: Presence of LME occurrence

TABLE 4

Material D (GI 100 g/m²)

| Bend R rp | Surface-layer strain | Forming-start temperature | | | | |
|---|---|---|---|---|---|---|
| | | 550° C. | 600° C. | 650° C. | 700° C. | 750° C. |
| 2.5 mm | 22% | ○ | ○ | X | X | X |
| 5.0 mm | 12% | ○ | ○ | ○ | X | X |
| 7.5 mm | 9% | ○ | ○ | ○ | X | X |
| 10 mm | 7% | ○ | ○ | ○ | ○ | — |
| 15 mm | 5% | ○ | ○ | ○ | ○ | — |

○: Absence of LME occurrence
X: Presence of LME occurrence

TABLE 5

Material E (GA 80 g/m²)

| Bend R rp | Surface-layer strain | Forming-start temperature | | | | |
|---|---|---|---|---|---|---|
| | | 550° C. | 600° C. | 650° C. | 700° C. | 750° C. |
| 2.5 mm | 22% | ○ | ○ | X | X | X |
| 5.0 mm | 12% | ○ | ○ | ○ | X | X |
| 7.5 mm | 9% | ○ | ○ | ○ | ○ | X |
| 10 mm | 7% | ○ | ○ | ○ | ○ | — |
| 15 mm | 5% | ○ | ○ | ○ | ○ | — |

○: Absence of LME occurrence
X: Presence of LME occurrence

It was found out from the results of Tables 2 through 5, respectively, that LME occurred on a condition that the forming-start temperature was high, and the curvature radius R of the bend of a tool was small (the surface-layer strain (the strain as added) of a steel sheet is large). It is regarded that this was because the higher a temperature at the time of forming is, the higher will be a liquid phase fraction of zinc, during coating, and the larger a tension strain of the surface-layer of the bend is, the easier it will be for zinc in a liquid phase to invade a grain boundary.

Table 6 is made up by superimposition of the respective results of Tables 2 through 5, one after another. In Table 6, the case where LME occurred with respect to any material (blank) (the case of LME occurrence irrespective of the material) is indicated as "X", the case of the LME occurrence (LME occurred depending on the material) is indicated as "▲", and the case of the absence of the LME occurrence with respect to any material (LME did not occur irrespective of the material) is indicated as "○".

TABLE 6

| Bend R | Surface-layer | Forming-start temperature | | | | |
|---|---|---|---|---|---|---|
| rp | strain | 550° C. | 600° C. | 650° C. | 700° C. | 750° C. |
| 2.5 mm | 22% | ○ | ○ | X | X | X |
| 5.0 mm | 12% | ○ | ○ | ▲ | X | X |
| 7.5 mm | 9% | ○ | ○ | ○ | ▲ | X |
| 10 mm | 7% | ○ | ○ | ○ | ○ | ○ |
| 15 mm | 5% | ○ | ○ | ○ | ○ | ○ |

Figure 4:
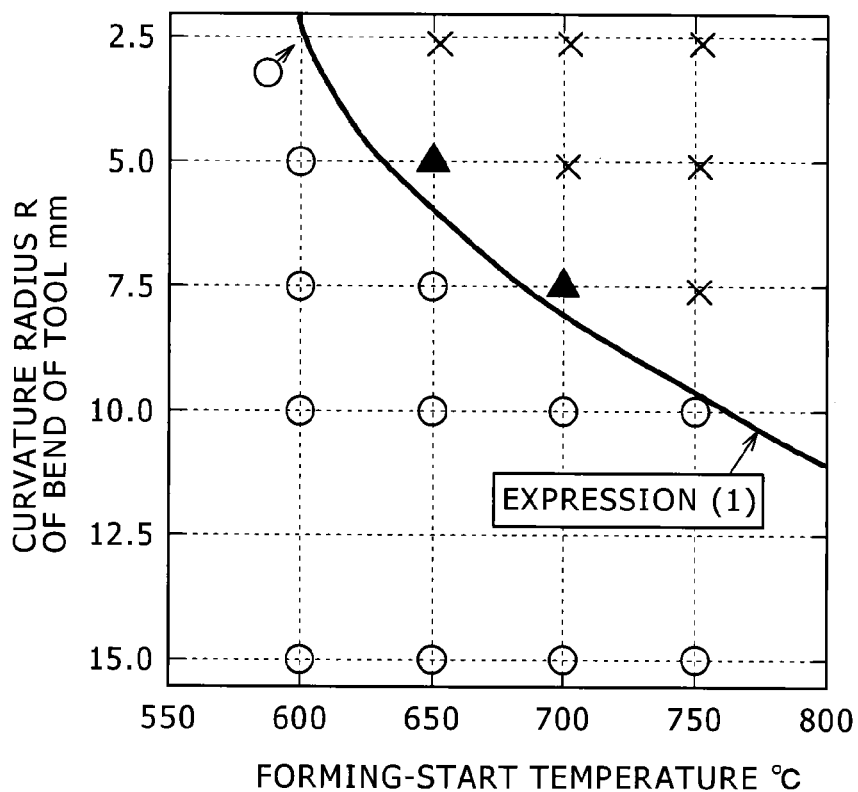
FIG. 4 is a view showing the presence or the absence of LME occurrence at the time of changing the forming-start temperature and the curvature radius R of the bend of a tool.

X: case of presence of LME occurrence irrespective of material,
▲: case of presence of LME occurrence depending on material,
○: case of absence of LME occurrence irrespective of material FIG. 4 is a graph prepared by plotting respective results shown in Table 6. It has become evident from FIG. 4 that a boundary line between a region where the LME occurs irrespective of a material (a blank) and a region where the LME does not occur irrespective of the material (the blank) can be expressed by a function using the forming-start temperature, the curvature radius of the bend of a tool, and the thickness of a galvanized steel sheet.

More specifically, in order to prevent LME occurrence, it need only be sufficient to execute forming by setting up such a forming-start temperature, a curvature radius of the bend of a tool, and thickness of the galvanized steel sheet, as to satisfy expression (1), as follows:

[formula 2]

$$\frac{R}{t} > \sqrt{a \cdot (T-b)} \tag{1}$$

Provided that R denotes a curvature radius (also referred to as "bend R") of the shoulder (a part of the shoulder, on the inner side of the bend, in particular; the same is applied below) of a tool for use in press forming, t sheet thickness of a galvanized steel sheet, T a forming-start temperature in hot-press forming, "a" a constant 0.2984, and "b" a constant 590. The curvature radius of a die shoulder, in the bend of a tool, is listed as rd, and the curvature radius of a punch shoulder is listed as rp, on occasions, hereunder. Further, if T is less than 590° C. in the expression (1), this means that the LME does not occur irrespective of R, and t.

Figure 5:
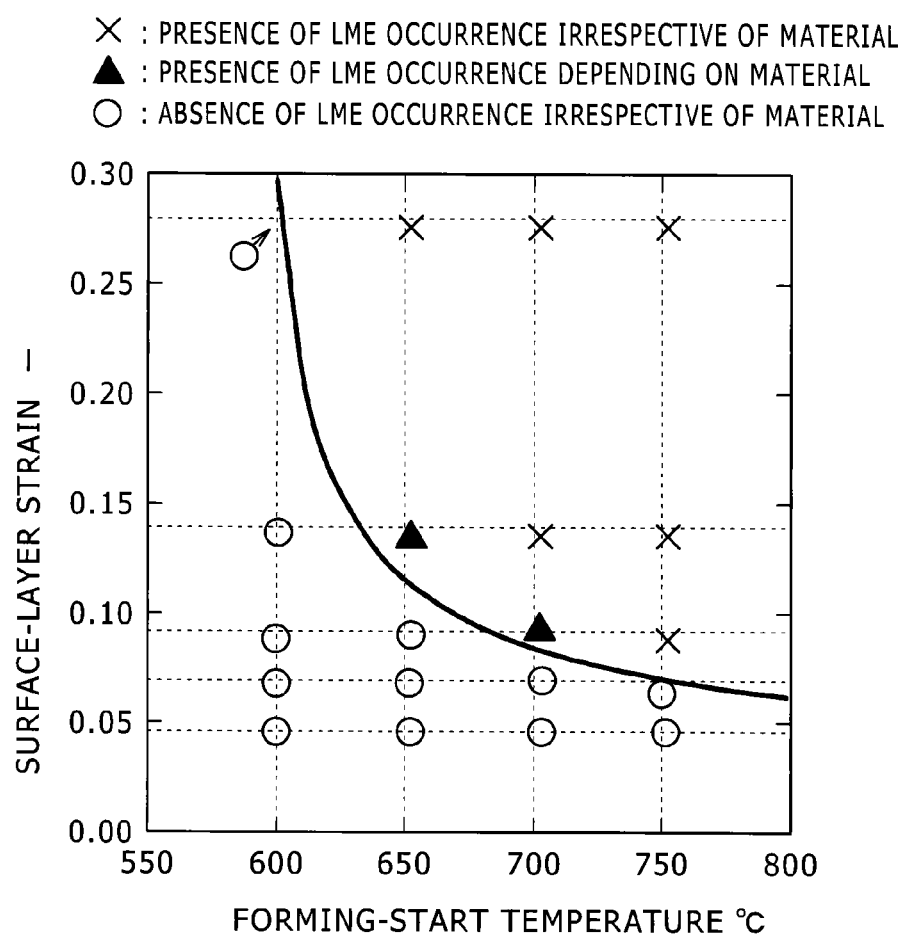
FIG. 5 is a view showing the presence or the absence of LME occurrence at the time of changing a forming-start temperature and a surface-layer strain.

A method for determining the constant a, and the constant b, respectively, is described as follows. First, the inventor, et al. assumed that a boundary line for determining whether or not LME occurs, as shown in FIG. 4, could be represented by relational expression indicating inverse proportion between ε (surface-layer strain) and T (forming-start temperature). Further, since this boundary line gets closer and closer to a line of the forming-start temperature: 590° C., the inventor, et al. assumed that the boundary line described as above may be expressed by formula of an inverse proportion, such as the following expression (i). FIG. 5 is a view obtained by adjusting FIG. 4 so as to show a relationship between ε (surface-layer strain) and T (forming-start temperature), by use of data from FIG. 4:

$$\varepsilon \times (T-590) = \text{a given value} \tag{i}$$

Then, in order to cause the solution of expression (i) to approach the boundary line for determining whether or not LME occurs, as shown in FIG. 5, amendments were made by trial and error, and as a result, it was found out that the boundary line could be expressed by the following expression.

$$\varepsilon \times (T-590)^{1/2} = 0.9153 \tag{ii}$$

More specifically, the region where the LME does not occur can be expressed by the following expression (iii):

$$\varepsilon \times (T-590)^{1/2} < 0.9153 \tag{iii}$$

Now, ε is generally expressed by the following expression (iv). Therefore, if ε expressed by expression (iv) is substituted for the expression (iii) to be modified, the following expression (v) is obtained:

$$\varepsilon = t/(2 \times R) \tag{iv}$$

Provided that R is the curvature radius of the shoulder of the tool for use in press forming, and t is the thickness of the galvanized steel sheet, in the expression (iv).

[formula 3]

$$\frac{R}{t} > \sqrt{0.2984 \cdot (T-590)} \tag{v}$$

With the present invention, it is determined from expression (v) described as above that 0.2984 is the constant a, and 590 is the constant b.

Further, if the expression (iii) is modified, formula for LME determination, using the strain ε added to the galvanized steel sheet, and the forming-start temperature T can be expressed by the following expression (2):

[formula 4]

$$\varepsilon < \frac{1}{2 \cdot \sqrt{a \cdot (T-b)}} \tag{2}$$

In the expression (2), ε is surface-layer strain, T is forming-start temperature (° C.), a is the constant (0.2984), and b is the constant (590).

Further, the case where a bend-angle will largely deviates from 90°, and the case where a strain due to bending, in combination with a strain due to tension, will be in action, are often encountered in an actual forming operation, however, in such cases, if E, and the forming-start temperature T, in a forming step, are estimated by use of a numerical simulation, and such a process design as to satisfy the relationship of the expression (2) described as above is set, this will also enable the LME occurrence to be prevented. For the numerical simulation, a general-purpose software Abaqus (manufactured by Dassault Systèmes K.K.) can be used, whereupon a temperature-strain coupled calculation can be carried out, however, any software may be used if it is software enabling a common temperature-strain coupled calculation to be performed.

In the case of executing L-bend forming at a different bend-angle, determination on whether or not LME occurs can be made by use of the strain ε in the expression (2). If, for example, 700° C. as the forming-start temperature T is substituted for the expression (2), ε<0.09 will hold, whereupon a range of the added strain (the surface-layer strain) without causing LME occurrence is estimated as less than 9%.

In order to verify this estimation, an experiment on L-bending at a specific angle (θ=90°, or θ=15°) was conducted as shown in FIG. 6 (*a*), and FIG. 7 (*a*), respectively. Experiment conditions, in FIG. 6 (*a*), and in FIG. 7 (*a*), respectively, are as follows:

a material used: the material (blank) sign A, shown in Table 1,
a heating temperature: 930° C.,
heating time: 6 minutes, and
a forming-start temperature: 700° C.

(1) When the Bend-Angle was 90°

In the case where the bend-angle was 90°, a strain of the steel sheet was calculated by means of the numerical simulation, whereupon the maximum strain (the surface layer strain of the steel sheet) was found at about 0.29 (29%). Since this is in excess of 9% described as above, LME occurrence can be determined if the bend-angle is 90°. This is in agreement with the result (LME occurrence) of the experiment, shown in FIG. 6 (*b*).

(2) When the Bend-Angle was 15°

Meanwhile, in the case where the bend-angle was 15°, the maximum strain was calculated by means of the numerical simulation, whereupon the maximum strain was found at about 0.06 (6%). Since this is below 9% described as above, LME non-occurrence can be determined if the bend-angle is 15°. This is in agreement with the result (LME non-occurrence) of the experiment shown in FIG. 7 (*b*).

Incidentally, a forming method, using such multiple steps as normally used in cold forming, is regarded more effective for prevention of LME, as a means for forming a complex shape. FIG. 8 is a view of a photograph showing a manufacturing example of a complex-shaped formed product manufactured by use of multiple-step cold-stamping according to the related art ((the 114$^{th}$ Plasticity Technology Lectures "Sheet Material Formation Basics and Application"), sponsored by: Japan Society for Technology of Plasticity (execution: Sheet-Material Formation Working Group), Hei 21 (2009), September 28, Mon. to September 30, Wed.).

Figure 9:
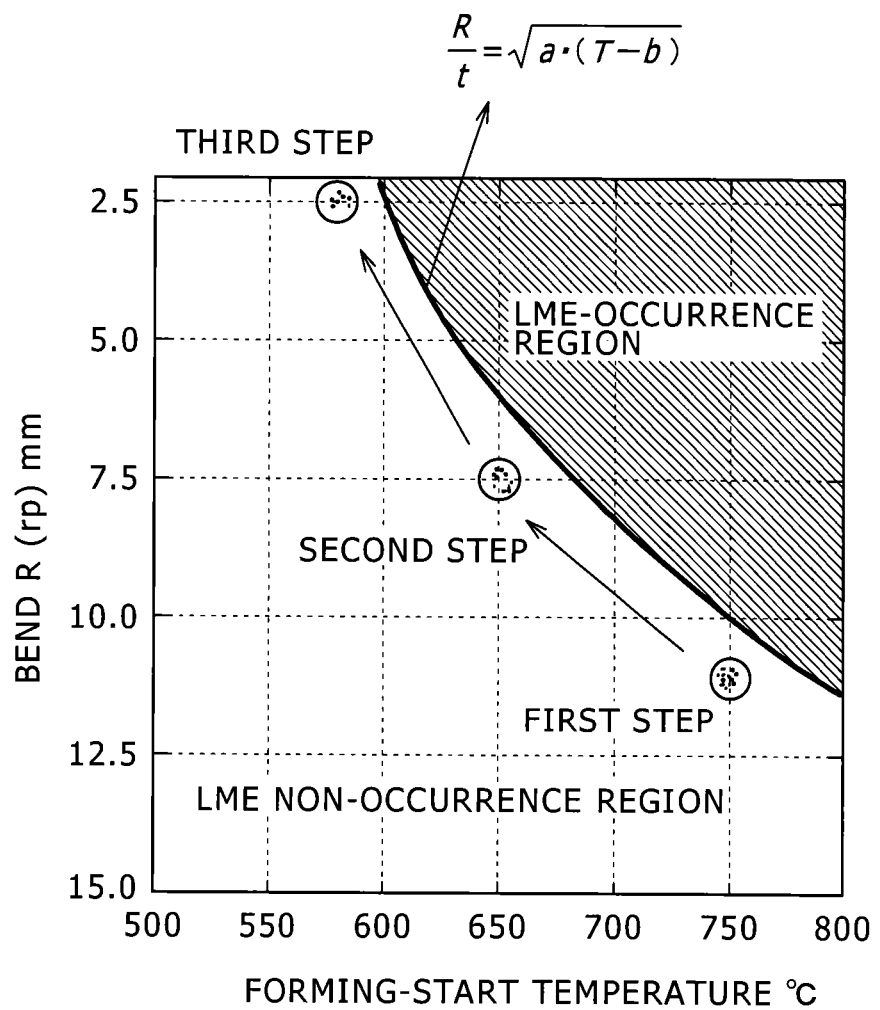
FIG. 9 is a view showing a relationship between a forming-start temperature and a curvature radius R (bend R, (rp)) of the bend of a tool, in the hot-press forming according to the invention.

With the present invention, hot-press forming is executed at least twice in a hot-press forming step and every hot-press forming is executed in such a way as to satisfy the expression (1) described as above. FIG. 9 is a view showing a relationship between the forming-start temperature and the curvature radius R (the bend R, (rp)) of the bend of a tool, in the hot-press forming according to the invention, and in the figure, there are executed three steps of the hot-press forming, in total. The respective steps are executed in an LME non-occurrence region (on condition that the expression (1) described as above is satisfied) as shown in FIG. 9, thereby enabling LME to be controlled. As the tool for use in hot-press forming, use is preferably made of a tool smaller in the curvature radius of the shoulder thereof than the tool used in hot-press forming executed prior to the relevant hot-press forming. According to this preferred embodiment, a multiple-step forming is executed such that the strain is rendered smaller in a high-temperature zone, and the strain is rendered larger in a low-temperature zone, while controlling the added strain, thereby enabling the LME to be further controlled.

With a technique of the multi-stage hot-press forming, shown in FIG. 9, a steel sheet is first formed into a lax and rough shape to be gradually reduced into a complex (sharp) shape, as with the case of a step of the multiple-step cold-stamping shown in FIG. 8, by way of example, so that not only the LME is satisfactorily controlled but also the forming of the steel sheet into more complex shape can be realized.

With the multiple-step hot-press forming according to the present invention, press forming in the last step is referred to as "final press forming", for the sake of convenience, and in the case of executing hot-press forming, other than the final press forming, ((more specifically, in the case of executing hot-press forming including n-steps, the hot-press forming in a 1-th step through an (n−1)-th step, respectively) is referred to as "preliminary forming" on occasions. The preliminary forming may be executed in one step, or in not less than two steps.

With the technique of multi-stage hot-press forming, the forming will less in strain at a high temperature when the coating is in liquid-phase state, the pressure of a contacted surface of a steel sheet, the steel sheet being subjected thereto at the time of the forming, can be controlled to a low-state. Accordingly, it is also possible to control adhesion of the coating to the tool.

It need only be sufficient to decide the forming-start temperature of the hot-press forming as appropriate according to the curvature radius R of the bend of the shoulder of the tool used in the press forming, and the thickness t of the galvanized steel sheet, in such a way as to satisfy the expression (1) described as above from the viewpoint of controlling LME in any of multiple steps. The forming-start temperature is preferably 400° C. or higher from the viewpoint of controlling an increase in the forming load as well as deterioration in the formability.

The galvanized steel sheet is heated to not less than a heating temperature: an $Ac_3$ transformation-point ($Ac_3$ point) prior to the step of the hot-press forming. If the heating temperature is less than the $Ac_3$ transformation-point, many ferrites are generated in the microstructure of a steel member, and strength required of the steel member cannot be secured. On the other hand, if the heating temperature is too high, the microstructure making up the steel member is coarsened to cause deterioration in ductility and bendability, resulting in considerable deterioration in zinc coating, thereby raising the risk that the steel member can no longer exhibit corrosion resistance. Accordingly, the upper limit of the heating temperature is preferably not higher than (the $Ac_3$ point+150) ° C., and more preferably, not higher than about (the $Ac_3$ point+100° C. Further, retention time at the heating temperature described as above is preferably within 10 minutes, more preferably within 6 minutes, and still more preferably within 4 minutes. And there may be no need for holding at the heating temperature described as above.

A steel member obtained by the manufacturing method according to the invention has strength expressed by TS not less than 780 MPa (Vickers hardness (listed as Hv, below) not less than 240), more preferably, TS not less than 980 MPa (Hv not less than 300), and still more preferably, TS not less than 1470 MPa (Hv not less than 450).

In the case where the multi-step hot-press forming is executed as with the case of the present invention, workin-process is air-cooled at the time of transportation between the steps, and a cooling rate is lowered, so that it becomes difficult to secure the strength of a steel component after the forming. Further, in the case where holding at the bottom dead center is not adopted, as well, it is difficult to secure the strength of the steel component after the forming. In order to attain TS not less than 780 MPa (Hv not less than 240) described as above, even in the case of the multi-step hot-press forming according to the invention, without holding at the bottom dead center, there is the need for adjusting chemical components of the base steel of a galvanized steel sheet for use in the hot press forming ((also chemical components of a hot-press formed steel-member obtained by use of the relevant galvanized steel sheet) as follows: the chemical components of respective elements are described below. The chemical composition includes C: not less than 0.10%, not more than 0.35%, Mn: not less than 1.0%, not more than 3.5%, Si: not less than 0.1%, not more than 2.5%, and Al: not more than 0.5% (not including 0%), with the balance being iron and unavoidable impurities.

(The Chemical Composition of the Base Steel of the Galvanized Steel Sheet)

[C: Not Less than 0.10%, not More than 0.35%]

The strength of the steel member primarily is dependent on a C-content. With the present invention, there is the need for the C-content not less than 0.10% in order to obtain a high strength by use of the method described as above (a multi-step process). The C-content is preferably not less than 0.15%, and more preferably not less than 0.18%. Further, the C-content is not limited to any upper-limit, in particular, from the viewpoint of securing the strength described as above, however, the upper-limit of the C-content is not more than 0.35% if properties (weldability, toughness, etc.) of a steel member as obtained, other than the strength thereof, are taken into consideration. The upper-limit of the C-content is preferably not more than 0.30%, and more preferably not more than 0.25%.

[Mn: Not Less than 1.0%, not More than 3.5%]

Mn is an element for causing enhancement in hardenability of a steel sheet. Further, in order to obtain a high-strength steel-member in the hot-press forming on the precondition of the multi-step, it is essential to control precipitation of a soft phase from austenite, occurring between the steps. Mn is an important element for controlling precipitation of the soft phase. Mn not less than 1.0% need be contained from these points of view. An Mn-content is preferably not less than 1.5%, more preferably not less than 1.8%, and still more preferably not less than 2.0%. However, even if the Mn content is in excess of 3.5%, the effect thereof will be saturated, thereby causing an increase in cost. Accordingly, the Mn-content is set to not more than 3.5%. The Mn-content is preferably not more than 3.0%, and more preferably, not more than 2.8%.

[Si: Not Less than 0.1%, not More than 2.5%]

In the process according to the present invention on the precondition of the multi-step, it is necessary to remove a formed steel-member from a tool, the formed steel-member being in a state where a forming-completion temperature is higher than that in a hot-press forming according to the related art (for example, cooled down to around 100° C. inside a tool after forming-completion, while leaving the tool just as it is). For this reason, a cooling rate after removal of the formed steel-member from the tool becomes lower than that in the case of the process according to the related art. Si is an element having the effect of controlling tempering of the microstructure of a steel member after removed in a high-temperature state from the tool. Even if cooling after removal of the steel member from the tool is slow in the multi-step hot-press forming, the strength of the steel member can be secured by the agency of Si contained therein. In order to obtain this effect, an Si content need be not less than 0.1%. If the Si-content is preferably not less than 0.5%, tempering in a low temperature zone, as well, can be controlled, and TS 1180 MPa or higher (Hv 360 or higher) can be attained. The Si-content is more preferably not less than 1.0%, and still more preferably, not less than 1.2%. Further, even if Si is added more than necessary, the effect thereof will be saturated, thereby causing deterioration in the surface properties of a base steel sheet, so that the Si-content is set to not more than 2.5%. The Si-content is preferably not more than 2.0%, and more preferably, not more than 1.5%.

[Al: Not More than 0.50% (not Including 0%)]

Al is an element for use in deoxidation, and an Al-content is preferably not less than 0.01%. On the other hand, if the Al content increases, an Ac$_3$ point of a steel sheet will rise. As a result, there arises the need for raising a heating temperature prior to press forming, and lengthening heating time, thereby causing a rise in the manufacturing cost of the steel member, due to an increase in necessary energy, and so forth. Accordingly, the Al-content is set to not more than 0.50%. The Al-content is preferably not more than 0.20%, more preferably, not more than 0.10% and still more preferably, not more than 0.050%.

The chemical components of the base steel are as described above, with the balance being iron and unavoidable impurities, (for example, P, S, N, O, As, Sb, Sn, etc.). Elements P and S, among the unavoidable impurities, are each preferably reduced in content from the viewpoint of securing weldability, and etc., such that a P-content is not more than 0.02% and an S-content is not more than 0.02%. Further, if an N-content is excessive, this will invite deterioration in toughness after the hot press forming, and deterioration in weldability, and so forth. Accordingly, the N-content is preferably controlled to not more than 0.01%. Further, an element O becomes the cause of a surface defect, and therefore, an O-content is preferably controlled to not more than 0.001%.

Even if a clearance of a tool is widened, securing of the strength of a formed product can be facilitated by use of a material excellent in hardenability. Accordingly, the clearance of a tool can be relaxed on a wider side to thereby enable a pressure of a contacted surface to be lowered. Furthermore, LME occurrence and coating adhesion on the tool will become more prone to be controlled by use of such a material as described above.

The galvanized steel sheet according to the invention may further contain the following elements within respective ranges where the base steel thereof does not interfere with the effects of the present invention.

[B: Not More than 0.005% (not Including 0%)]

B is an element for use in enhancement of hardenability to thereby prevent precipitation of a soft phase, occurring between the adjacent steps of the multiple steps. Accordingly, B is an element effective for securing a high strength (Hv: not less than 450) in the multi-step hot-press forming. In order for B to exhibit this effect, a B-content is preferably not less than 0.0003%, more preferably, not less than 0.0015%, still more preferably, not less than 0.0020%. On the other hand, if the B-content is excessive, this will cause excessive generation of BN to thereby invite deterioration in toughness. Accordingly, the B-content is preferably controlled to not more than 0.005%. The B-content is more preferably not more than 0.0040%, and still more preferably not more than 0.0035%.

[Ti and/or Nb: Not More than 0.10%, in Total, (not Including 0%)]

Ti and Nb have the effect of turning the microstructure of a steel member finer to thereby enhance strength—ductility balance in a steel member. These elements not less than 0.015% (more preferably, not less than 0.020%), in total, are preferably contained from this point of view. On the other hand, if the total content of Ti and Nb is excessive, the strength of a base steel sheet will increase more than necessary to thereby invite deterioration in service life with respect to cutting—punching tools (resulting in an increase in cost). Accordingly, the total content of these elements is set to not more than 0.10% (preferably, not more than 0.06%, and more preferably, not more than 0.04%).

[Ni and/or Cu: Not More than 0.5%, in Total, (not Including 0%)]

Ni and Cu each are an element effective in enhancing hardenability of a steel sheet, being also an element useful in enhancement of delayed-fracture resistance of a formed product. In order for Ni and/or Cu to exhibit such effects as described, not less than 0.01% of Ni and/or Cu, in total, is preferably contained, and more preferably, not less than 0.1% of Ni and/or Cu, in total, is contained. However, if the content of these elements is excessive, this will become the cause of a surface defect occurring at the time of manufacturing a steel sheet. As a result, deterioration in pickling property occurs to thereby invite deterioration in productivity. Accordingly, the content of these elements in total is preferably set to not more than 0.5% (more preferably, not more than 0.3%)

[Cr and/or Mo: Not More than 3.5%, in Total, (not Including 0%)]

Cr and Mo each are an element effective in enhancing hardenability. Further, in order to obtain a steel member high in strength, it is essential to control the precipitation of the soft phase from austenite, occurring between the steps in the multiple-step hot-press forming, as described in the foregoing. Mn is an element that is most effective in controlling the precipitation of the soft phase, however, the same effect can be obtained by the agency of Cr, or Mo, as well. Accordingly, not less than 0.1% of these elements, in total, is preferably contained, and the content of these elements in total is more preferably, not less than 0.15%, still more preferably, not less than 0.20%, and further more preferably, not less than 0.25%. On the other hand, if an addition amount of these elements exceeds 3.5%, the effect thereof will be saturated to thereby create a factor for a rise in cost. Since these elements are expensive in terms of cost, auxiliary addition of these elements in addition to Mn described as above is desirable. Accordingly, the content of these elements is preferably not more than 3.5%, in total, more preferably not more than 3.0%, in total, and still more preferably not more than 2.8%, in total.

(Method for Manufacturing Blank)

There is no particular limitation to a method for manufacturing a blank (galvanized steel sheet), the base steel thereof, satisfying the component composition described as above. Continuous casting, heating, hot rolling, and furthermore, cold rolling, after pickling, are each executed by use of a normal method to be followed by an annealing, as necessary, thereby obtaining a hot rolled steel sheet, and a cold rolled steel sheet. In addition, coating (zinc-contained coating, etc.) is applied to the hot rolled steel sheet, and the cold rolled steel sheet, respectively, whereupon a coated steel sheet (a hot-dip galvanizing-coated steel sheet (GI), etc.), and the coated steel sheet subjected to alloying (a hot-dip galvannealing-coated steel sheet (GA), etc.) can be obtained.

A transformation temperature ($Ac_3$ point) at which transformation to austenite is completed when steel is heated is expressed by expression (3) as follows:

$$Ac_3\ point(°\ C.)=910-203\times\sqrt{[C]}-15.2\times[Ni]+44.7\times[Si]+104\times[V]+31.5\times[Mo]+13.1\times[W]-30\times[Mn]-11\times[Cr]-20\times[Cu] \quad (3)$$

Provided that 0 is substituted for a chemical component not contained in the steel This application claims a Convention Priority on Japanese Patent Application No. 2012-083003, filed on Mar. 30, 2012. The whole content of the description of Japanese Patent Application No. 2012-083003, filed on Mar. 30, 2012, is incorporated herein by reference.

EMBODIMENTS

The present invention is more specifically described below with reference to embodiments of the invention. However, it is to be pointed that the invention be obviously not limited by any of the embodiments described below and that the invention may be needless to say practiced by adding suitable modifications and variations thereto without departing from teachings of the invention, described previously and hereinafter, any of the modifications and variations being incorporated in the technical range of the invention.

First Embodiment

Figure 10:
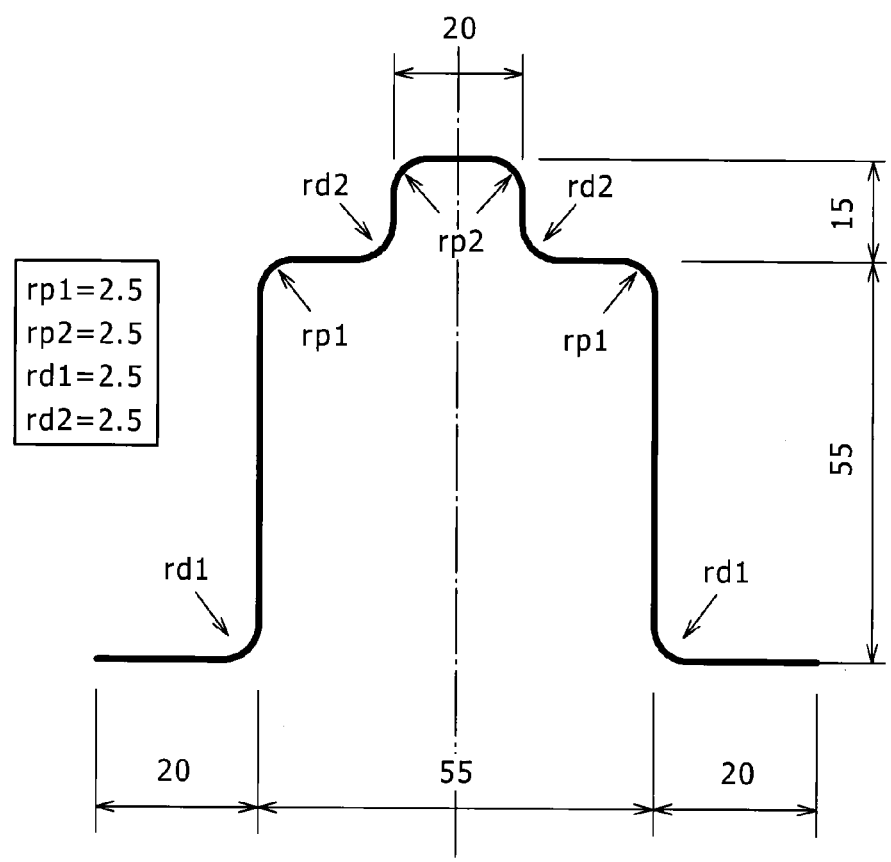
FIG. 10 is a sectional view showing an example of a hot-press formed steel-member (final formed product) according to the invention.

Hot-press forming (simple bend-forming (forming)) was applied to a blank of 230 mm in length×50 mm in depth (a hot-dip galvanizing-coated steel sheet obtained by subjecting the material A in Table 1 previously described to hot-dip galvanization) that was heated at 930° C. for 6 minutes, to be formed into a shape shown in FIG. 10. Forming conditions are shown in Table 7. The blank was formed into the shape shown in FIG. 10 in one step under conditions 1 and 2, respectively, as shown in Table 7. Further, under the conditions 1, and 2, respectively, the forming was executed with the use of an oil-hydraulic press on a condition that bottom dead center holding-time was for 10 seconds.

If the condition 1 ((T=750° C., and t (thickness)=1.4 mm, shown in Table 7) is substituted for the expression (1), R>9.7 holds. In other words, it is required that the curvature radius (rd) of the shoulder of a die as well as the curvature radius (rp) of the shoulder of a punch is in excess of 9.7 mm in order to prevent LME occurrence under the condition 1. In contrast thereto, use was made of a tool with rp1=2.5 mm, rp2=2.5 mm, rd1=2.5 mm, and rd2=2.5 mm, as shown in FIG. 10, under the condition 1, that is, the forming was executed on a condition failing to satisfy the expression (1).

Further, if the condition 2 ((T=600° C., and t (thickness)= 1.4 mm, shown in Table 7)) is substituted for the expression (1), R>2.4 holds. In other words, it is required that the curvature radius (rd) of the shoulder of a die as well as the curvature radius (rp) of the shoulder of a punch is in excess of 2.4 mm in order to prevent LME occurrence under the condition 2. In comparison therewith, forming was executed with the use of a tool of rp1=2.5 mm, rp2=2.5 mm, rd1=2.5 mm, and rd2=2.5 mm, as shown in FIG. 10, under the condition 2, that is, under a condition satisfying the expression (1) (further, good forming was not possible under the condition 2 because quenching prior to stamping was carried out in one step, as described later on in the present description).

Meanwhile, a condition 3 represents an example in which forming was executed according to a method prescribed by the present invention. To describe in detail, a blank was formed into a shape shown in FIG. 10 in two steps of the preliminary forming to a main forming (final forming), as shown in FIGS. 11 (a) and 11 (b), respectively, with the use of a crank press. Manual transportation was adopted between the steps. Further, forming was executed without holding at the bottom dead center. Transportation time from a heating furnace (heating at 930° C. for 6 minutes) to a tool for the preliminary forming was 10 seconds.

A preliminary forming start-temperature under the condition 3 is 750° C. If T=750° C., and t (thickness)=1.4 mm are substituted for the expression (1), in the case where the forming-start temperature T is 750° C., as in this case, R>9.7 holds. In other words, a range permissible to the curvature radius (rd) of the shoulder of a die as well as the curvature radius (rp) of the shoulder of a punch in order to prevent LME occurrence is in excess of 9.7 mm. In order to satisfy this calculated condition (that is, the expression (1)), rp1=27.5 mm, and rd 1=10.0 mm were adopted with respect to a tool for use in the preliminary forming under the condition 3.

Further, the temperature T of the galvanized steel sheet at the time of starting the main forming (the final forming) is 600° C. If T=600° C., and t (thickness)=1.4 mm are substituted for the expression (1), in the case of the forming-start temperature being 600° C., as in this case, R>2.4 holds. In other words, the range permissible to the curvature radius (rd1, 2) of the shoulder of the die as well as the curvature radius (rp1, 2) of the shoulder of the punch in order to prevent LME occurrence is in excess of 2.4 mm. In order to satisfy this calculated condition (that is, the expression (1)), rp1=2.5 mm, rp2=2.5 mm, rd1=2.5 mm, and rd2=2.5 were adopted with respect to the tool for use in the final forming under the condition 3.

With the forming executed under the conditions 1 through 3, respectively, the presence or the absence of the LME occurrence of the galvanized steel sheet was examined as described in the foregoing. Further, the presence or the absence of cracking of the galvanized steel sheet was examined by visual inspection. The results of the examinations are shown in Table 7.

to stamping. Upon the start of forming after quenching at a cooling rate of 30° C./sec up to 600° C., as shown in the condition 2 in Table 7, the LME was found in as-controlled state, however, cracking occurred to the galvanized steel sheet. That is, if the forming is executed in one step according to the condition 2, it is evident that cracking occurs to the galvanized steel sheet.

In contrast, if the multi-step hot-press forming is executed by a method prescribed by the present invention, as shown in the condition 3 of Table 7, it is evident that both the LME and the cracking can be controlled. An excess metal portion (refer to FIG. 11 (a)), introduced in the preliminary forming, largely contributes to the control of the cracking.

Further, the forming was executed without holding at the bottom dead center under the condition 3, as described above, with the use of the crank press, as with the case of the cold stamping. If the holding at the bottom dead center is dispensed with, productivity at the time of forming can be dramatically enhanced.

Further, as the number of formed-products was increased under the condition 1, there was observed adhesion of a coating onto a portion of the tool, ranging from the shoulder of a die to the longitudinal wall thereof. On the other hand, it was observed that the adhesion of the coating onto the tool was under good control in the case of the condition 3 satisfying requirements of the invention even though the number of the formed-products was increased. It is considered that this is because the forming was executed with the use of a large die shoulder R (rd=10.0) in the preliminary forming executed at a high temperature under the condition 3, so that the pressure of a contact surface, acting on the tool, at the time of the forming, was lowered. Thus, it was found out that the present invention was effective not only for reduction in the LME but also for reduction in the adhesion of the coating onto the tool. If the adhesion of the coating onto the tool is reduced, this will be advantageous in that less frequent maintenance of the tool is sufficient.

Second Embodiment

Forming was executed with the use of a variety of materials, shown in Table 8, under a forming condition identical to that under the condition 3 shown in Table 7. To be described in detail, multi-step forming was executed with the use of a steel sheet (the blanks B through E, respectively, in Table 1), a base steel thereof, having preferable chemical

TABLE 7

| Condition | Number of steps | Forming-start temperature | Presence or absence of quenching prior to forming | LME rp1 | rp2 | rd1 | rd2 | Cracking |
|---|---|---|---|---|---|---|---|---|
| Condition 1 | 1 | 750° C. | None (only transportation) | x | x | x | x | x |
| Condition 2 | 2 | 600° C. | Yes (by use of air) | o | o | o | o | x |
| Condition 3 | 3 | Preliminary forming: 750° C. Final forming: 600° C. | None (only transportation) | o | o | o | o | o |

Because forming was executed under the condition 1 such that a blank was formed into the shape shown in FIG. 10 in one step, under a condition failing to satisfy the expression (1), as shown in Tale 7, LME occurred and cracking occurred to the galvanized steel sheet.

Figure 12:
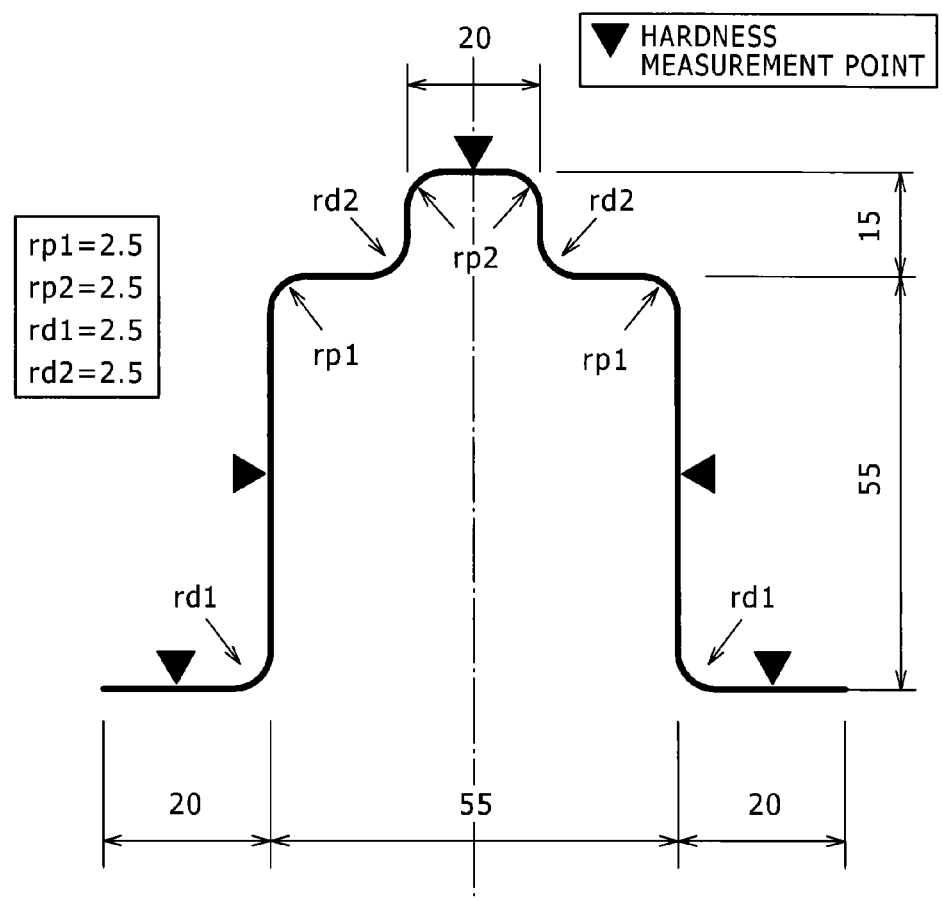
FIG. 12 is a sectional view showing hardness-measurement points with respect to a hot-press formed steel-member according to the present embodiment.

The condition 2 in Table 7 simulates a technology according to the prior art, whereby quenching is carried out prior components (including an Si content: not less than 0.5%, and prescribed contents of respective selected elements (B, Ti, Cu, Cr)), in addition to the basic chemical components thereof)) under conditions 4 through 10, respectively. The forming was executed under a forming condition identical to the condition 3 shown in Table 7 except that the material of a galvanized steel sheet in use was different from that under the condition 3. And the hardness of a formed-product (steel member) obtained was examined by the following method. More specifically, hardness (Vickers hardness) at a position of a load 1 kgf, and ¼ t (thickness) was measured with respect to 5 points of a steel member, in section, as shown in FIG. 12, to thereby find an average hardness-value of the 5 points. The results of such examination are shown in Table 8. Results (hardness) under the condition 3 in Table 7, as well, are shown in Table 8.

Further, with the use of a galvanized steel sheet, the base steel thereof, having a preferable chemical composition, as is the case with the second embodiment, a sufficiently high strength can be secured even if a clearance between tools is set so as to be on a wider side. Accordingly, the clearance can be set to the wider side to thereby relieve the pressure of a contacted surface, imposed on a tool, so that this method will be more advantageous with respect to LME control, and control of adhesion onto the tool.

TABLE 8

| Condition | Material | Coating | Coating Weight (g/m²) | Number of steps | Forming-start temperature | Presence or absence of quenching prior to forming | LME rp1 | rp2 | rd1 | rd2 | Cracking | Hv |
|---|---|---|---|---|---|---|---|---|---|---|---|---|
| Condition 3 | Material A | GI | 70 | 2 | Preliminary forming: 750° C. Final forming: 600° C. | None | ○ | ○ | ○ | ○ | ○ | 300 |
| Condition 4 | Material B | GI | 70 | | | | ○ | ○ | ○ | ○ | ○ | 470 |
| Condition 5 | Material B | GA | 45 | | | | ○ | ○ | ○ | ○ | ○ | 470 |
| Condition 6 | Material C | GI | 70 | | | | ○ | ○ | ○ | ○ | ○ | 460 |
| Condition 7 | Material C | GA | 45 | | | | ○ | ○ | ○ | ○ | ○ | 460 |
| Condition 8 | Material D | GI | 100 | | | | ○ | ○ | ○ | ○ | ○ | 380 |
| Condition 9 | Material E | GA | 80 | | | | ○ | ○ | ○ | ○ | ○ | 460 |
| Condition 10 | Material E | GA | 35 | | | | ○ | ○ | ○ | ○ | ○ | 460 |

It is clear that there were attained Hv=300 and TS not less than 980 MPa, in addition to LME control, cracking control, and control of adhesion of the coating onto the tool, under the condition 3, as is evident from Table 8. Furthermore, it is evident that higher strength (Hv: not less than 380, and further, Hv not less than 450), in addition to LME control, control of cracking of a steel sheet, and control of adhesion of coating onto a tool can be attained under conditions 4 through 10, respectively, where the chemical composition of a base steel is adjusted such that respective elements fall within a preferable range.

Thus, with the use of the galvanized steel sheet, the chemical components of the base steel thereof, satisfying the basic chemical components, it is possible to achieve not less than Hv=300 by adoption of the multi-step hot-press forming without holding at the bottom dead center. Furthermore, with the use of the galvanized steel sheet, the respective chemical components of the base steel thereof, being adjusted so as to fall within a preferable range, hardness not less than Hv=380 (further, not less than Hv=450) can be achieved by adoption of the multi-step hot-press forming without holding at the bottom dead center, so that high strength as well as productivity, equivalent to that in the case of the cold stamping forming, can be realized.

Further, it has been confirmed that if the chemical composition of the base steel is different, and a coating type is different, a substantially similar effect will result although a slight difference occurs with respect to the expression (1), and if a press-formed shape is set according to the criteria of the expression (1), a process design on a safer side will be made even if the chemical component of the base steel as well as the coating type is changed, as with the case with the present embodiment. Furthermore, with the present embodiment, there is shown an embodiment example where the heating time was set to 6 minutes, however, it has been confirmed that the advantageous effect of the present invention can be obtained even in the case of the heating time being 3 minutes or, 4 minutes.

LIST OF REFERENCE SIGNS

1: hemi-spherical punch,
2: die,
3: blank holder,
4: blank (galvanized steel sheet)

The invention claimed is:

1. A method for manufacturing a hot-press formed steel-member, the method comprising:
   providing a galvanized steel sheet comprising a base steel having a chemical composition comprising
   from 0.010 mass % to 0.35 mass % of C,
   from 1.0 mass % to 3.5 mass % of Mn,
   from 0.1 mass % to 2.5 mass % of Si, and
   from greater than 0 mass % to 0.5 mass % of Al,
   with the balance being iron and unavoidable impurities;
   heating the galvanized steel sheet to not lower than an $Ac_3$ transformation-point; and
   executing hot-press forming at least twice after the heating,
      wherein every hot-press forming is executed so as to satisfy the following expression (1):

$$\frac{R}{t} > \sqrt{a \cdot (T - b)}, \quad (1)$$

wherein
   "R" is a curvature radius (mm) of a shoulder of a tool used in the hot-press forming,
   "t" is a thickness (mm) of the galvanized steel sheet,
   "T" is a forming-start temperature (° C.) of the hot-press forming,
   "a" is a constant 0.2984, and
   "b" is a constant 590.

2. The method for manufacturing a hot-press formed steel-member, according to claim 1, wherein a curvature of radius for the shoulder of the tool used in the latter hot-press forming is smaller than that of the tool used in the previous hot-press forming.

3. The method for manufacturing a hot-press formed steel-member, according to claim 1, wherein the base steel of the galvanized steel sheet comprises the Si-content not less than 0.5%.

4. The method for manufacturing a hot-press formed steel-member, according to claim 1, wherein the base steel of the galvanized steel sheet further comprises from greater that 0 mass % to 0.005 mass % of B.

5. The method for manufacturing a hot-press formed steel-member, according to claim 1, wherein the base steel of the galvanized steel sheet further comprises from greater that 0 mass % to 0.10 mass % of Ti and/or Nb.

6. The method for manufacturing a hot-press formed steel-member, according to claim 1, wherein the base steel of the galvanized steel sheet further comprises from greater that 0 mass % to 0.5 mass % of Ni and/or Cu.

7. The method for manufacturing a hot-press formed steel-member, according to claim 1, wherein the base steel of the galvanized steel sheet further comprises from greater that 0 mass % to 3.5 mass % of Cr and/or Mo.

8. The method for manufacturing a hot-press formed steel-member, according to claim 1, wherein the galvanized steel sheets is obtained by applying a hot-dip galvanizing coating (GI) or a hot-clip galvannealing coating (GA) to base steel sheet.

9. The method for manufacturing a hot-press formed steel-member, according to claim 8, wherein a coating weight of the hot-dip galvanizing coating (GI) is from 70 $g/m^2$ to 100 $g/m^2$.

10. The method for manufacturing a hot-press formed steel-member, according to claim 1, wherein the forming-start temperature is from 550 to 750° C.

11. The method for manufacturing a hot-press formed steel-member, according to claim 1, wherein the curvature radius of a shoulder of a tool is form 2.5 to 15 mm.

12. The method for manufacturing a hot-press formed steel-member, according to claim 1, comprising executing hot-press forming at least three times after the heating.

13. The method for manufacturing a hot-press formed steel-member, according to claim 1, wherein a heating time is from 3 to 6 minutes.

* * * * *